Aug. 10, 1965   F. J. FONTANA   3,199,141
CASTER MOUNTING ARRANGEMENT
Filed May 4, 1962

INVENTOR
Frank J. Fontana

Attorney

United States Patent Office 3,199,141
Patented Aug. 10, 1965

3,199,141
CASTER MOUNTING ARRANGEMENT
Frank J. Fontana, Bridgeport, Conn., assignor to Stewart-Warner Corporation, a corporation of Virginia
Filed May 4, 1962, Ser. No. 192,386
2 Claims. (Cl. 16—18)

This invention relates to a caster mounting arrangement operable to improve tracking of the caster wheel and eliminate caster shimmy when the caster wheel is normally only in partial contact with the supporting surface.

It is common to support articles, such as grocery carts, tea wagons, or the like on four or more spaced casters. The relative heights of the casters are adjusted during installation so that in use normally on a flat supporting surface all caster wheels contact the supporting surface. Since three point support is stable, on an uneven or non-flat supporting surface, the fourth of the spaced caster wheels can have poor or even no contact with the supporting surface. Under such a situation, movement of the supported article along the supporting surface causes the poorly contacted caster to track poorly on the supporting surface or to shimmy relative to the supported article. This is not only annoying and cumbersome to the user, but can also damage both the caster and the supporting surface.

Accordingly, an object of this invention is to provide a caster mounting arrangement which eliminates or minimizes the shimmy of the caster when the caster wheel tends not to have firm contact with the supporting surface.

In order that this and other objects will be more fully appreciated, reference is herein made to the specification and accompanying drawing forming a part thereof, wherein.

Figure 2:
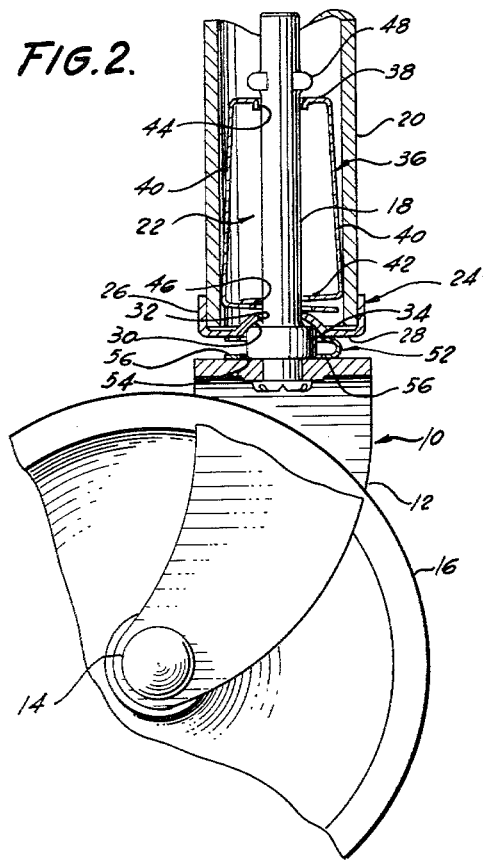
FIG. 2 is a view as seen from line 2—2 of FIG. 1.
Figure 1:
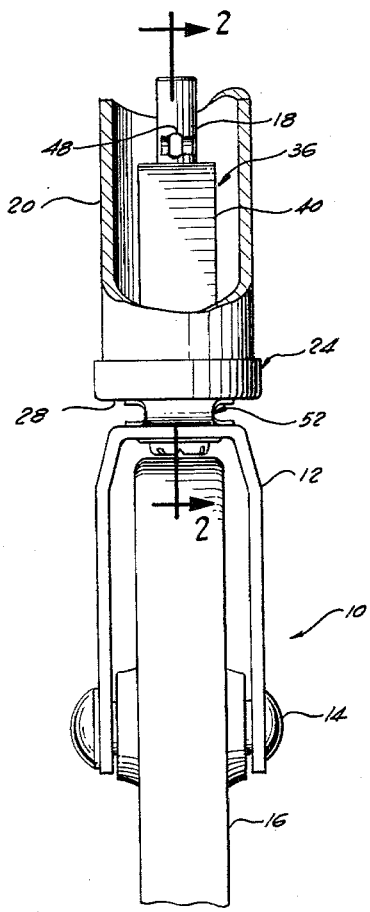
FIG. 1 is a front elevational view of a caster and the subject caster mounting arrangement shown in assembled relationship at the lower open end of a tubular leg.

Referring to FIGS. 1 and 2 of the drawing, the caster 10 includes a frame 12 rotatably supporting an axle 14 a caster wheel 16. The wheel is adapted as is well known in the art to roll along a supporting floor surface (not shown). A pintle 18 secured as by riveting to the frame 12 projects into a tubular leg 20 for connection thereto through appropriate mounting means 22 within the leg.

In the embodiment shown the mounting means 22 include a cap or cup-shaped retainer 24 having a side wall 26 adapted to fit over and snugly receive the lower free end of the leg 20. The bottom wall 28 of cup 24 includes a dished concave center portion 30 surrounding a central opening 32 for receipt of the pintle 18. An enlarged annular shoulder 34 on pintle 18 abuts the concave center 30 forming a bearing contact therewith. The abutment of the cup 24 and shoulder 34 limits axial thrust of the pintle 18 toward the supported article.

A spring retaining device 36 includes a steel bar bent in a generally tapered box section having an upper wall 38, a pair of spaced side walls 40, and overlapping inwardly directed bottom walls 42. The top wall 38 has an opening 44, and the overlapping bottom walls 42 have aligned slots 46 therein adapted to receive the pintle 18. Each side wall 40 and its corresponding bottom wall 42 thus can be moved within the limits of slots 46 radially toward the centered pintle 18 against the outwardly directed resiliency of the device. Ears 48 are crimped from the pintle 18 above the top wall 38 to limit withdrawal movement of the pintle from the retaining device 36.

The mounting structure 22 is secured to the leg 20 by fitting spring retaining device 36 into the leg and then forcing the entire assembly axially of the leg until the leg is positioned within the retainer cup 24. The frictional engagements of the spring legs 40 with the inside of the leg, and the cup 24 on the outside of the leg secure the structure to the leg. The caster pintle can move axially relative to the mounting structure between the confines inwardly of the shoulder 34 abutting the retainer cup 24, and outwardly of the crimped ears 48 against the top wall 38.

According to the improvement of the subject invention there is purposely provided between the above-mentioned confines of the pintle a limited degree of axial play. Thus the distance between the adjacent sides of the crimped ears 48 and the shoulder bearing 34 is slightly in excess of the distance between the remote sides of upper wall 38 of retaining device 36 and the concave bearing 30 of the retainer cap 24. Included also in the subject arrangement is a light spring 52 interposed between the caster and the supported article.

Figure 3:
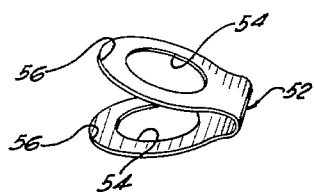
FIG. 3 is a perspective view of a spring used in the subject invention.

The spring 52 is C-shaped as can be seen in FIGS. 2 and 3 and has aligned openings 54 in its opposed walls 56. The aligned openings 54 receive freely the shoulder portion 24 of the pintle 18. In the interposed position between the cup 24 and the caster 10, the spring 52 acting through the walls 56 tends to bias the pintle to its outward position retained by the ears 48. The biasing force of the spring also provides a slight friction drag between the caster and the supported article resisting free rotation of the caster about the pintle 18.

Upon removal of load from the caster excessive of the force of spring 52, the spring acting between the caster 10 and the supported cup 24 tends to move the pintle axially. The caster wheel thus is moved in the direction away from the supported leg 20 within the free axial movement of the pintle provided to follow the uneven curvature of the supporting surface.

Consider a supported article having four or more casters spaced from one another in a generally square or rectangular fashion and supported by the subject mounting arrangement to bottom-out on a flat supporting surface. If the supporting surface is varied from flat, such as by having one of the casters on a hump while the other casters are over the flat surface, the loading on the casters is unsteady. The caster on the hump and the caster diagonally opposite thereto are on the high side relative to the supporting surface and will be bottomed-out. The other two diagonally opposite casters are on the low side relative to the preadjusted height and will be between the bottomed-out position and the fully extended outward position. The springs 52 will thus cause at least one of the unrestrained casters to move away from the supported article to contact the supporting surface and ensure firm contact of all the wheels. Even if the limited axial play of the caster is insufficient to meet the supporting surface firmly, the dampening friction provided by spring 52 between the caster and retainer cup 24 eliminates shimmy of the caster about the pintle 18.

It will be noted that spring 52 does not carry the load of the caster, since all thrust is carried by the bottom-out bearings of shoulders 24 and cup 34. Also the spring 52 is never completely compressed between the caster and supported article even upon fully loading the caster. This permits the use of a light economical spring which will nevertheless be ensured of a long service life.

While a specific embodiment of the subject invention is shown, it will be obvious to those skilled in the art that other modifications can be made without departing from the inventive concepts thereof. It is thus desired that the invention be limited only by the scope of the appended claims.

What is claimed is:

1. A caster comprising means for rotatably carrying a caster wheel, a pintle extending from said means, means for engaging said pintle with the leg of an article to be supported on said caster wheel while enabling a predetermined degree of axial movement between said pintle and said leg, said engaging means comprising an annular cup-shaped member carried by said pintle for engaging the bottom edge and outer periphery of said leg, and a U-shaped spring retaining device carried by said pintle and adapted to engage the inner periphery of said leg to clamp said pintle to said leg with the back leg of said U-shaped device serving as a stop to limit said axial movement of said pintle to said predetermined degree, a single integrally formed spring having planar walls engaging respective planar walls on the carrying means and article leg, and means for biasing said pintle and carrying means from said leg while simultaneously restraining relative rotational movement between said carrying means and said leg.

2. A caster as defined in claim 1 in which said planar wall of the article leg is defined by the lower surface of said annular cup-shaped member.

References Cited by the Examiner

UNITED STATES PATENTS

| | | | |
|---|---|---|---|
| 791,590 | 6/05 | Stull et al. | 151—38 |
| 1,409,150 | 3/22 | Blood | 16—44 |
| 1,649,527 | 11/27 | Herold | 16—38 |
| 2,042,525 | 6/36 | Herold | 16—44 |
| 2,172,004 | 9/39 | Anderson | 16—44 |
| 2,848,732 | 8/58 | Huff | 16—38 |

FOREIGN PATENTS 854,143  11/60  Great Britain.

DONLEY J. STOCKING, *Primary Examiner.*